United States Patent [19]
Dougherty

[11] Patent Number: 6,002,561
[45] Date of Patent: *Dec. 14, 1999

[54] ARCING FAULT DETECTION MODULE

[75] Inventor: John J. Dougherty, Collegeville, Pa.

[73] Assignee: General Electric Company, Schenectady, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 09/006,796

[22] Filed: Jan. 14, 1998

[51] Int. Cl.$^6$ .................................................. H02H 3/00
[52] U.S. Cl. ............................. 361/42; 361/93; 361/102
[58] Field of Search .................. 361/42–50, 93–102, 361/115; 335/18, 215, 35

[56] References Cited

U.S. PATENT DOCUMENTS

| | | | |
|---|---|---|---|
| 3,596,218 | 7/1971 | Layton | 335/17 |
| 3,596,219 | 7/1971 | Erickson | 335/17 |
| 4,466,071 | 8/1984 | Russell, Jr. | 364/492 |
| 4,510,611 | 4/1985 | Dougherty | 375/8 |
| 4,513,268 | 4/1985 | Seymour et al. | 335/35 |
| 4,658,322 | 4/1987 | Rivera | 361/37 |
| 4,847,850 | 7/1989 | Kafka et al. | 372/71 |
| 4,878,144 | 10/1989 | Nebon | 361/96 |
| 4,931,894 | 6/1990 | Legatti | 361/45 |
| 5,121,282 | 6/1992 | White | 361/42 |
| 5,185,684 | 2/1993 | Beihoff et al. | 361/45 |
| 5,185,685 | 2/1993 | Tennies et al. | 361/45 |
| 5,185,686 | 2/1993 | Hansen et al. | 361/45 |
| 5,185,687 | 2/1993 | Beihoff et al. | 361/45 |
| 5,206,596 | 4/1993 | Beihoff et al. | 324/536 |
| 5,208,542 | 5/1993 | Tennies et al. | 324/544 |
| 5,223,682 | 6/1993 | Pham et al. | 218/63 |
| 5,224,006 | 6/1993 | MacKenzie et al. | 361/45 |
| 5,245,498 | 9/1993 | Uchida et al. | 361/47 |
| 5,307,230 | 4/1994 | MacKenzie | 361/96 |
| 5,359,293 | 10/1994 | Boksiner et al. | 324/544 |
| 5,420,740 | 5/1995 | MacKenzie et al. | 361/45 |
| 5,432,455 | 7/1995 | Blades | 324/536 |
| 5,434,509 | 7/1995 | Blades | 324/536 |
| 5,452,223 | 9/1995 | Zuercher et al. | 324/102 |
| 5,453,723 | 9/1995 | Fello et al. | 335/18 |
| 5,459,630 | 10/1995 | MacKenzie et al. | 324/520 |
| 5,483,211 | 1/1996 | Carrodus et al. | 335/18 |
| 5,493,278 | 2/1996 | Mackenzie et al. | 340/638 |
| 5,510,946 | 4/1996 | Franklin | 361/56 |
| 5,519,561 | 5/1996 | Mrenna et al. | 361/105 |
| 5,546,266 | 8/1996 | Mackenzie et al. | 361/93 |
| 5,550,751 | 8/1996 | Russell | 364/528.28 |

(List continued on next page.)

OTHER PUBLICATIONS

W.H. Kwon, et al. High Impedance Fault Detection Utilizing Incrmental Variance of Normalized Even Order Harmonic Power IEEE Transactions on Power Delivery vol. 6, No. 2, Apr. 1991 pp. 557–564.

*Primary Examiner*—Jeffrey Gaffin
*Assistant Examiner*—Michael J. Sherry
*Attorney, Agent, or Firm*—Cantor Colburn LLP; Carl B. Horton

[57] ABSTRACT

An arcing fault detection module (4) for detecting arcing faults in an electrical current distribution circuit (8) comprises a filter circuit (9) and an autocorrelation circuit (10). The filter circuit (9) is electrically connected to the distribution circuit (8) and samples current with the distribution circuit. The filter circuit (9) includes a band pass filter (12) to filter out fundamental and high frequency components from the sampled current, and a comparator (13) to convert the sampled current to a digital signal. The autocorrelation circuit (10) receives the digital signal from the filter circuit (9). The autocorrelation circuit (10) includes a plurality of shift registers (15–18) for storing the digital signal for a predetermined sample period, and a plurality of EXCLUSIVE-OR gates (35–37, 41, 43, 44) and OR gates (38, 39) to detect odd and even harmonic signals. An integrator-counter (47) electrically connects to certain EXCLUSIVE-OR and OR gates, and provides an arc indicative signal when the absolute value of the even and odd harmonic signals is equal to a predetermined number.

18 Claims, 3 Drawing Sheets

U.S. PATENT DOCUMENTS

| | | | |
|---|---|---|---|
| 5,561,605 | 10/1996 | Zuercher et al. | 364/483 |
| 5,578,931 | 11/1996 | Russell et al. | 324/536 |
| 5,590,012 | 12/1996 | Dollar, II | 361/113 |
| 5,600,526 | 2/1997 | Russell et al. | 361/65 |
| 5,602,709 | 2/1997 | Al-Dabbagh | 361/85 |
| 5,659,453 | 8/1997 | Russell et al. | 361/93 |
| 5,831,500 | 11/1998 | Turner et al. | 335/17 |

ARCING FAULT DETECTION MODULE

BACKGROUND OF THE INVENTION

The occurrence of called "arcing faults" within industrial and residential establishments has resulted in a large number of patents and publications relating to the nature of the arcing faults and how to determine its occurrence.

The higher frequency conditions that occur with the arcing faults, lends to isolating the higher frequency harmonics and comparing the harmonics to reference harmonic values indicative of an arcing fault.

U.S. Pat. No. 5,602,709 entitled "High Impedance Fault Detector" describes one such means for detecting arcing fault occurrence.

U.S. Pat. No. 5,561,605 entitled "Arc Detection Using Current Variation" teaches arcing fault detection by sampling line current with a harmonic notch filter. U.S. Pat. No. 4,466,071 entitled "High Impedance Fault Detection Apparatus and Method describes the prevalence of even harmonics within the arcing fault frequency pattern.

Arcing currents, viewed in the frequency domain, have elements of the fundamental frequency, even harmonics and odd harmonics of the fundamental. Many non-linear loads such as light dimmers, computers, and dc supplies show fundamental and odd harmonics, but tend not to have even harmonics.

Measurement of such even harmonics therefore provides an effective, selective means of detecting arcing in power line current. Conventional techniques for even harmonic measurement employ digital signal processing computers and sampled data systems that may be overly expensive for residential application. Discrete Fourier Transforms or Fast Fourier Transforms are required for separating the odd harmonics from the electrical signal. A description of one approach to even harmonic measurement is found in *IEEE Transactions on Power Delivery*, Vol. 6, No. 2, April 1991 entitled "High Impedance Fault Detection Utilizing Incremental Variance of Normalized Even Order Harmonic Power"

U.S. Pat. No. 5,659,453 entitled "Arc Burst Pattern Analysis Fault Detection System" describes a circuit arrangement for analyzing half cycles of the fundamental current to determine whether arcing faults may be present.

One purpose of the instant invention is to describe an economical approach to arcing fault detection that does not require complex electronic filters and the like to detect the presence of such even harmonics and the absence of odd harmonics for arcing fault determination.

SUMMARY OF THE INVENTION

In an exemplary embodiment of the invention, an electronic circuit is connected with an electrical distribution system for arcing fault detection. The fundamental and high frequency components are filtered from line current in the electric distribution system by a conventional filter. The remaining frequencies are then processed through a comparator to convert the frequency signals to polarities which are sampled at a multiple of the fundamental frequency. An autocorrelation circuit consisting of a shift register, multiple exclusive and/or gates detect even and odd harmonics. An exclusive-or gate is used to determine the presence of an arcing fault based on the comparison of the odd and even harmonics.

BRIEF DESCRIPTION OF THE DRAWINGS

FIG. 2 is a schematic representation of the main and branch breakers of FIG. 1a.

DESCRIPTION OF THE PREFERRED EMBODIMENT

Figure 1A:
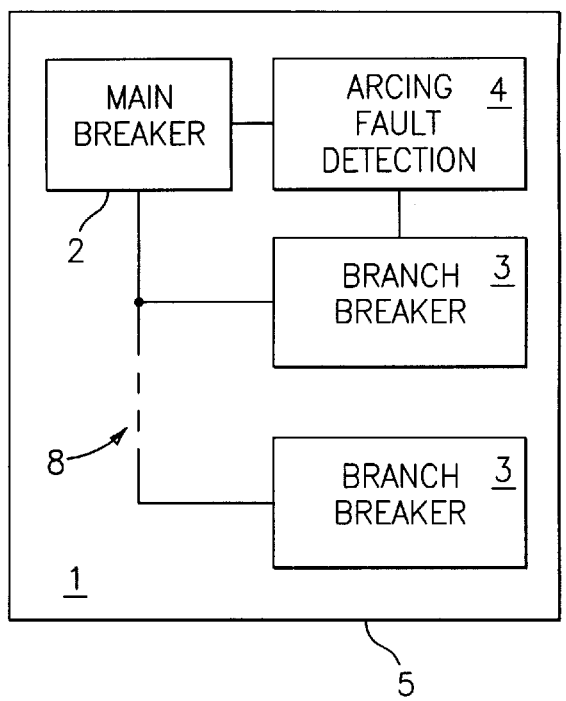
FIG. 1a is a schematic representation of an electric current distribution circuit including the circuit breaker enclosure of the present invention with an arcing fault detection module providing a trip signal to the main breaker.

Referring to FIG. 1a, the circuit breaker enclosure of the present invention, generally designated 1, includes a main circuit breaker 2, branch circuit breakers 3, and an arcing fault detection module 4 within a common housing 5. The main circuit breaker 2 is electrically connected to branch circuit breakers 3 forming part of electrical current distribution circuit 8. Arcing fault detection module 4 is connected to the distribution circuit 8 via branch circuit breakers 3 and is arranged to provide a trip signal to the main circuit breaker 2.

Figure 2:
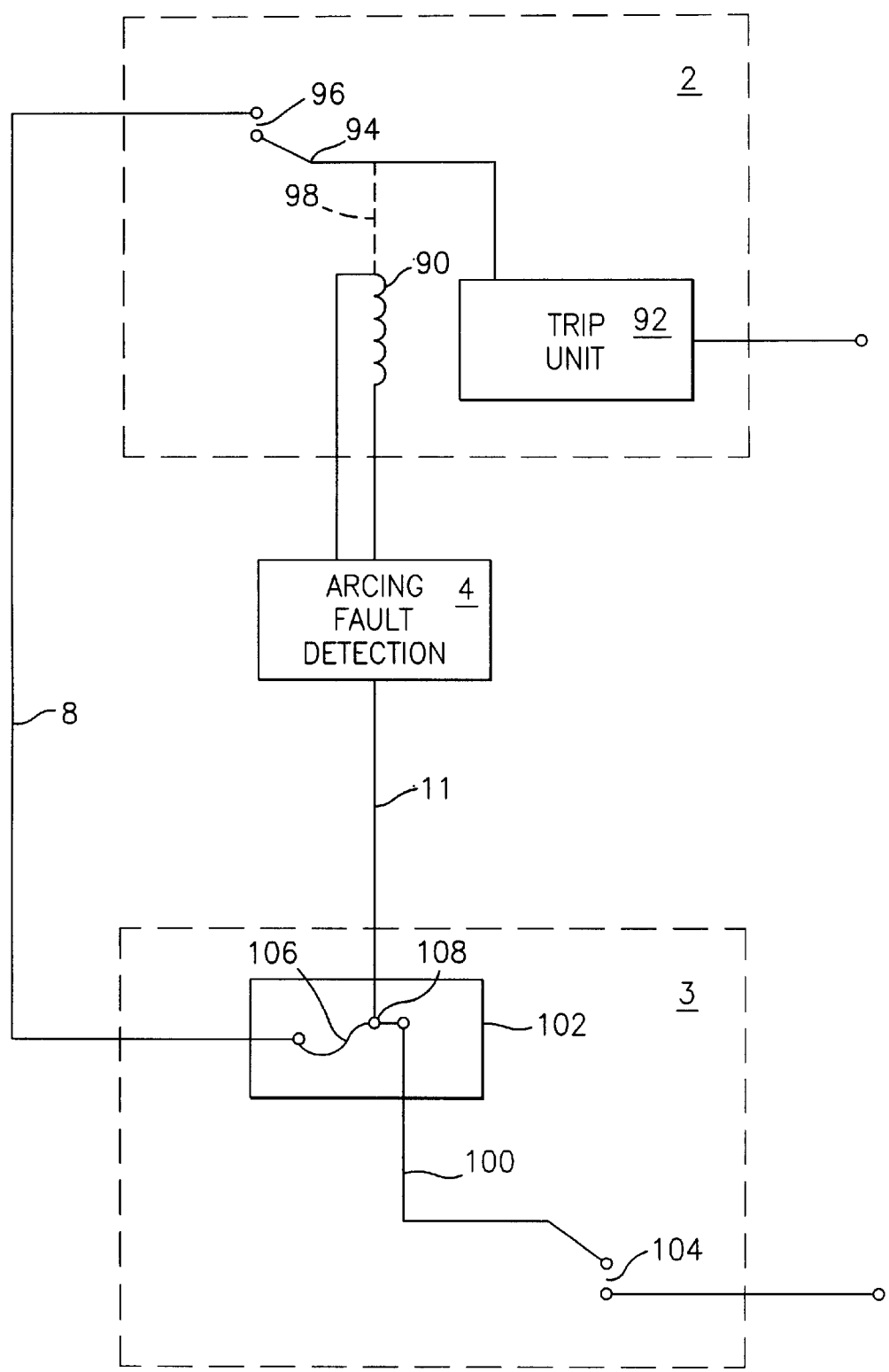

As shown in FIG. 2, the main circuit breaker 2 includes a main operating mechanism 94 connected to a main trip unit 92, a main trip solenoid 90 (via main trip plunger 98), and contacts 96. The main trip unit 92 interacts with the main operating mechanism 94 to separate the main contacts 96 upon occurrence of an overload current through the main contacts 96. The main trip solenoid 90 is arranged to receive a trip solenoid actuating signal from the arcing fault detection module 4. Upon receiving the trip solenoid actuating signal, the main trip solenoid 90 interacts with the main trip plunger 98, thereby articulating the operating mechanism 94 which opens the circuit breaker contacts 96 to interrupt current flow within the electric distribution circuit 8.

Branch circuit breakers 3 include a branch operating mechanism 100 connected to a branch trip unit 102 and contacts 104. Branch circuit breakers 3 provide overcurrent protection for the branches of the distribution circuit 8. The branch trip unit 102 comprises a bimetal (bimetallic strip) 106 forming part of the distribution circuit 8 and arranged to interact with the branch operating mechanism 100. Branch conductors 108 connect across bimetal 106 for providing a current signal indicative of the arcing fault current to the arcing fault detection module 4.

Figure 3:
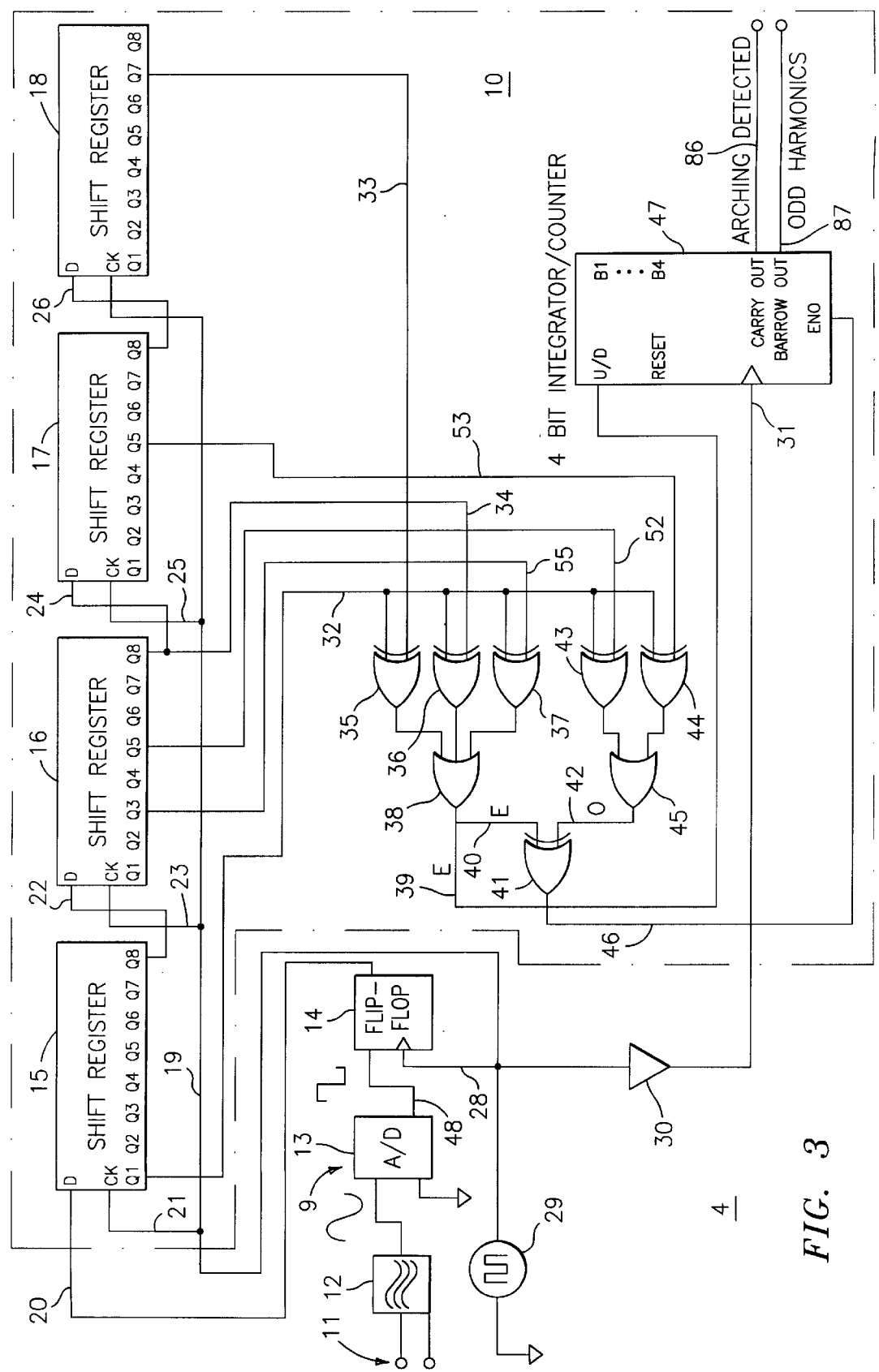
FIG. 3 is a schematic representation of the arcing fault detection module of the present invention.

The arcing fault detection module 4 is shown in FIG. 3 and includes a filter circuit 9 and an autocorrelation receiver circuit 10 for sampling and comparing frequencies within an electrical distribution circuit to which connection is made by means of input terminals indicated at 11. The autocorrelation receiver is similar to that described within U.S. Pat. No. 4,510,611 entitled "Transceiver Circuit for Interfacing Between a Power Line Communication System and a Data Processor". The filter circuit 9 is electrically connected to input terminals 11 and to the autocorrelation circuit 10. Filter circuit 9 comprises a band pass filter 12, a comparator 13, and a FLIP–FLOP 14. The current passes through a band pass filter 12 to filter out the fundamental and high frequency components. The remaining frequencies, i.e. the $2^{nd}$ thru $6^{th}$ harmonics of the fundamental pass through a comparator 13 where the frequency signals are converted to corresponding digital signals. The flip–flop 14 is clocked at 7200 HZ by means of the timing crystal 29 which provides the same timing signal to an output integrator 47 through an inverter 30 over conductor 31. The output of the comparator 13 is inputted to a FLIP–FLOP 14 over conductor 48 and the output of the FLIP–FLOP 14 is connected with the D port of a first shift register 15 over conductor 20. The FLIP–FLOP 14 and first shift register 15 are both clocked at the same timing signal by connection with the timing crystal 29 over conductors 19, 21 and 23. The Q8 port from the first register 15 connects with the D port of the second register 16 by means of conductor 22 and the Q8 port of the second register 16 connects with the D port of the third register 17 over conductor 24. The clock port of the third register 17 connects with the timing crystal 29 over conductors 19 and 25, as indicated. The Q8 port of the third register 17 connects with the D port of the fourth register 18 over conductor 26 and the clock port of the fourth register 18 connects with the timing crystal 29 over conductor 19.

The autocorrelation function is performed on the odd and even frequency signals by interconnecting the shift registers 15–18 with the corresponding EXCLUSIVE-OR gates 35–37 and 43,44 in the following manner. The Q1 port of the first register 15 is connected with the first input to the EXCLUSIVE-OR gates 35–37 and 43,44 over conductor 32. The second input to EXCLUSIVE-OR gate 35 connects with the Q7 port of the fourth register 18 over conductor 33. The second input to EXCLUSIVE-OR gate 36 connects with the Q8 port of the second register 16 over conductor 34. The second input to EXCLUSIVE-OR gate 37 connects with the Q3 port of the second register 16 over conductor 55. The second input to EXCLUSIVE-OR gate 43 connects with the Q5 port of the second register 16 over conductor 52 and the second input to EXCLUSIVE-OR gate 44 connects with the Q5 port of the third register 17 over conductor 53.

The even harmonic signals occurring at the outputs of the EXCLUSIVE-OR gates 35–37 are all inputted to the OR gate 38 and the output of the OR gate is inputted to both the Up–Down port of the 4 bit integrator-counter 47 over conductor 39 as well as one input to EXCLUSIVE-OR gate 41 over conductor 40 for purposes to be discussed below in greater detail. The odd harmonic signals occurring at the outputs of the EXCLUSIVE-OR gates 43,44 are inputted to an OR gate 45 and the output of the OR gate 45 is inputted to the other input to EXCLUSIVE-OR gate 41 over conductor 42. The output of the EXCLUSIVE-OR gate 41 is inputted to the ENABLE port of the integrator-counter 47 over conductor 46 to complete the circuit.

The autocorrelation function improves over that described within the aforementioned U.S. Pat. No. 4,510,611 by explicitly measuring the even and odd harmonic signals to more accurately distinguish the even from the odd harmonics for precise indication of the occurrence of an arcing fault.

In accordance with the invention, the bandpass filter 12 limits the input current signal to frequencies above the fundamental (60 Hz) and below the $7^{th}$ harmonic (420 Hz). The comparator 13 and DQ flip–flop 14 convert the current signals to polarity signals, high or logic true for positive input, low or logic false for negative inputs and the polarity signals are sampled at 7200 Hz, 120 times the fundamental. The sample polarity signals are then stored for 32 sample periods in the shift registers 15–18. At each positive clock edge, the polarity is sampled and the shift registers are 'clocked' to shift the last 31 samples down the delay path. The first delayed sample occurring at Q1 in the first register 15, is an input to the EXCLUSIVE-OR gates 35–37, 43, 44 and is labeled $2^{nd}$, $4^{th}$, $6^{th}$, $5^{th}$, $3^{rd}$, to represent the harmonic of interest. The EXCLUSIVE-OR gates 35–37,43,44 take their $2^{nd}$ input from one of 5 delayed samples for measuring each harmonic at a period of one half cycle. For a pure harmonic, the polarity at a period delayed one half cycle is always the opposite of the instant polarity. The sample period is $\frac{1}{120}^{th}$ of the fundamental or the fundamental repeats each 120 samples. The $2^{nc}$ nd harmonic for example, has twice the frequency of the fundamental and therefore repeats after 60 samples resulting in a half cycle period of 30 samples. Referring to FIG. 1, the second input to the EXCLUSIVE-OR gate 35 for the $2^{nd}$ harmonic is the $30^{th}$ shift register output after the first delayed sample and represents an exact half cycle for the $2^{nd}$ harmonic. If the $2^{nd}$ harmonic is present, the output of EXCLUSIVE-OR gate 35 will always be true. The $3^{rd}$ harmonic requires a 20 period delay, the $4^{th}$ harmonic a 15 period delay, the $5^{th}$ harmonic a 12 period delay and the $6^{th}$ harmonic a 10 period delay. The sample rate of 120 times the fundamental was obtained by multiplying the common factors of 2 thru 6 together and multiplying again by the factor of 2 for the half cycle. It is noted that additional harmonics can be added by increasing the sample rate to other multiples and adding corresponding shift registers. To add the seventh harmonic, a sample rate of 840 (120 * 7) times the fundamental would be required and at least 210 shift register stages would be required to measure the $2^{nd}$ harmonic.

The even harmonics are combined in the OR gate 38, designated signal "E", and the odd harmonics combined in the OR gate 45, designated signal "O". Applying the following Truth Table:

| Action | Signal E | Signal O |
| --- | --- | --- |
| Count Up | true | false |
| Count Down | false | true |
| No Count | true | true |
| No Count | false | false |

It is noted a count will only occur, up or down, if the outputs are different and one of the EXCLUSIVE-OR gates 35–37,43,44 tests this condition and enables the integrator-counter 47. The up or down direction of the integrator-counter 47 is a function of the E signal. The integrator-counter 47 is clocked by the inverted clock signal ½ count after the shift registers 15–18 change state to allow for logic settling to provide an output, carry or borrow, when the net number of counts, i.e. absolute value of the even and odd signals, equals 16. Subsequent processing can provide thresholds for arcing fault detection depending on the average current level and the accumulation of net even and odd counts, respectively.

Upon occurrence of the a trip solenoid actuating signal upon output conductors 86, 87, the time division multiplexer (not shown) commences to output the signal to each of the conductor pairs 35A, 35B (not shown) within the cable 71 (not shown) until the output signal appearing at the output of the EXCLUSIVE/OR GATE 83 (not shown) ceases to result in a signal input to the shift register (not shown) such that the output signal over conductors 86, 87 drops to zero.

Figure 1B:
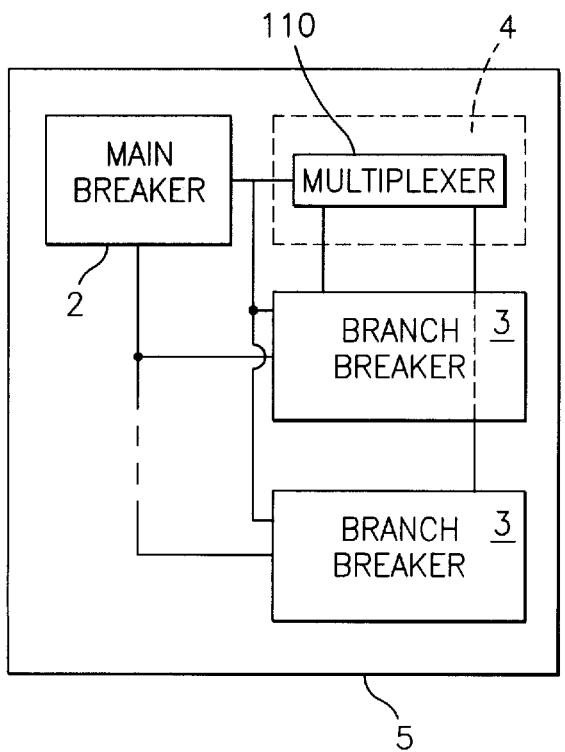
FIG. 1b is a schematic representation of an electronic current distribution circuit including the circuit breaker enclosure of the present invention with the arcing fault detection module providing a trip signal to the branch breakers.

Referring to FIG. 1b, the arcing fault detection module 4 provides a trip signal to branch circuit breakers 3. Branch circuit breakers 3 alternatively includes a branch trip solenoid (not shown), similar to the main trip solenoid 90 in main circuit breaker 2 (shown in FIG. 2), for receiving a trip solenoid actuating signal from the arcing fault detection module 4 and tripping individual branch circuit breakers 3. The arcing fault detection module 4 alternatively includes a multiplexer 110 to allow individual branch signal currents to be processed separately.

It has herein been shown that a sensitive arcing fault detector circuit can be employed in cooperation with the main circuit breaker in a multiple circuit breaker enclosure whereby the main circuit breaker can respond to interrupt the circuit to all the branch circuits connected therewith. It has also been shown that an individual branch circuit can be interrupted upon arcing fault occurrence within the individual branch circuit by the addition of time multiplex function to the arcing fault detection circuit.

I claim:

1. A circuit breaker enclosure for providing overcurrent and arcing fault protection to an electric current distribution circuit, the circuit breaker enclosure comprising:

a main circuit breaker electrically connected in series with a plurality of branch circuit breakers within a common housing; and an arcing fault detection module arranged for interrupting a pair of main contacts within said main circuit breaker upon occurrence of an arcing fault current through a pair of branch contacts within one of said branch circuit breakers, the arcing fault detection module having an autocorrelation circuit to compare even and odd harmonic frequencies within the arcing fault current for detecting the presence of an arcing fault.

2. The circuit breaker enclosure of claim 1 wherein said main circuit breaker includes a main operating mechanism and a main trip unit interacting with said main operating mechanism to separate said main contacts upon occurrence of an overload current through said main contacts, said main circuit breaker further including a main trip solenoid having a main trip plunger arranged for articulating said main operating mechanism independent of said main trip unit upon occurrence of said arcing fault current through said one branch circuit breaker contacts.

3. The circuit breaker enclosure of claim 1 wherein said arcing fault detection module includes an electronic filter for filtering out fundamental and predetermined high frequency components from electric current transferring through said electric distribution circuit; and wherein said an autocorrelation circuit provides an autocorrelation function on remaining frequency components to determine the presence of an arcing fault within said distribution circuit.

4. The circuit breaker enclosure of claim 3 including a comparator connecting with said filter providing odd and even polarity signals representative of said current transferring through said electric distribution circuit.

5. The circuit breaker enclosure of claim 4 including a FLIP–FLOP connecting with said comparator and said autocorrelation circuit and with a clock signal for sampling said odd and even polarity signals at a rate equal to 120 times said fundamental frequency.

6. The circuit breaker enclosure of claim 5 wherein said even polarity signals comprise $2^{nd}$ thru $6^{th}$ harmonics of said fundamental frequency.

7. The circuit breaker enclosure of claim 5 wherein said autocorrelation circuit includes means for storing said odd and even polarity signals for a predetermined sample period.

8. The circuit breaker enclosure of claim 5 wherein said storing means comprise a plurality of cascaded shift registers.

9. The circuit breaker enclosure of claim 5 wherein said autocorrelation circuit a plurality of first logic gates for separating said odd and even signals.

10. The circuit breaker enclosure of claim 5 wherein said cascaded registers are connected with inputs to a first set of EXCLUSIVE-OR gates, corresponding outputs from said EXCLUSIVE-OR gates being connected with inputs to a first OR gate for determining occurrence of said even polarity signals.

11. A circuit breaker enclosure for providing overcurrent and arcing fault protection to an electric current distribution circuit, the circuit breaker enclosure comprising:

a main circuit breaker electrically connected in series with a plurality of branch circuit breakers within a common housing; and an arcing fault detection module arranged for interrupting a pair of branch contacts within one of said branch circuit breakers upon occurrence of an arcing fault current within a branch of the electric current distribution circuit connecting with said one branch circuit breaker, the arcing fault detection module having an autocorrelation circuit to compare even and odd harmonic frequencies in the arcing fault current for detecting the presence of an arcing fault.

12. The circuit breaker enclosure of claim 11 wherein said one branch circuit breaker includes a branch operating mechanism and a branch trip unit interacting with said branch operating mechanism to separate said branch contacts upon occurrence of an overload current through said branch contacts, said branch circuit breaker further including a branch trip solenoid having a branch trip plunger arranged for articulating said branch operating mechanism independent of said branch trip unit upon occurrence of said arcing fault current through said one branch circuit breaker contacts.

13. The circuit breaker enclosure of claim 11 wherein said branch circuit breaker includes a branch bimetal within a branch trip unit for determining said overcurrent condition, and a first pair of branch conductors connecting across said branch bimetal and connecting with said arcing fault detection module for providing a current signal indicative of said arcing fault current to said arcing fault detection module.

14. The circuit breaker enclosure of claim 13 wherein said branch circuit breaker includes a second pair of branch conductors connecting with a branch trip solenoid for receiving an operating signal from said arcing fault module and operating said branch trip solenoid to articulate a branch operating mechanism and separate said branch contacts upon detection of arcing fault current through said branch contacts.

15. The circuit breaker enclosure of claim 11 wherein said arcing fault detection module includes a multiplexer for allowing individual branch signal currents to be processed separately within said arcing fault detection circuit.

16. An arcing fault detection module for detecting arcing faults in an electrical current distribution circuit, the arcing fault detection module comprising:

a filter circuit electrically connected to the electrical distribution circuit for providing a digitized signal representative of predetermined frequencies within a current passing through the distribution circuit; and an autocorrelation circuit electrically connected to the filter circuit for comparing odd and even frequency components of the digitized signal to detect the presence of an arcing fault in the electrical distribution circuit.

17. An arcing fault detection module, as defined in claim 16, wherein the filter circuit includes:

a band pass filter arranged for receiving a sampled current representative of the current passing through the distribution circuit and filtering out predetermined frequency components from the sampled current; and a comparator electrically connected to the band pass filter for converting the sampled current to the digitized signal.

18. An arcing fault detection module, as defined in claim 16, wherein the autocorrelation circuit includes:
- a plurality of cascaded shift registers electrically connected to the filter circuit for storing the digitized signal for a predetermined sample period;
- a first plurality of EXCLUSIVE-OR gates electrically connected to the cascaded shift registers and to inputs of a first OR gate for detecting the occurrence of the even frequency components of the digitized signal; and
- a second plurality of EXCLUSIVE-OR gates electrically connected to the cascaded shift registers and to inputs of a second OR gate for detecting the occurrence of the odd frequency components of the digitized signal.

* * * * *